(12) United States Patent
Kao et al.

(10) Patent No.: US 6,263,410 B1
(45) Date of Patent: Jul. 17, 2001

(54) APPARATUS AND METHOD FOR ASYNCHRONOUS DUAL PORT FIFO

(75) Inventors: Ming-Tsan Kao, Kaohsiung; Ming-Mao Chiang, Hsinchu; Ming-Fen Lin, Taipei; Won-Yih Lin, Taichung, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/153,679

(22) Filed: Sep. 15, 1998

(51) Int. Cl.[7] .............................. G06F 12/00; G06F 13/00
(52) U.S. Cl. ............................................ 711/156; 710/57
(58) Field of Search ..................................... 711/104, 156; 365/221, 236, 219; 710/57

(56) References Cited

U.S. PATENT DOCUMENTS

| 5,084,841 | 1/1992 | Williams et al. | 365/189 |
|---|---|---|---|
| 5,371,877 | 12/1994 | Drako et al. | 395/425 |
| 5,426,756 | * 6/1995 | Shyi et al. | 395/425 |
| 5,491,659 | * 2/1996 | Howarter et al. | 365/219 |
| 5,546,347 | 8/1996 | Ko et al. | 365/221 |
| 5,555,524 | * 9/1996 | Castellano | 365/221 |
| 5,592,629 | 1/1997 | Gamble | 395/250 |
| 5,768,325 | * 6/1998 | Yamamoto et al. | 375/372 |
| 5,991,834 | * 11/1999 | Hawkins et al. | 710/57 |
| 6,061,768 | * 5/2000 | Kuo et al. | 711/156 |

* cited by examiner

Primary Examiner—Matthew Kim
Assistant Examiner—Pierre H. Vital

(57) ABSTRACT

An apparatus and method for controlling an asynchronous dual port FIFO memory is provided. The asynchronous FIFO may operate at frequencies satisfying $0.5f_2<f_1<f_2$ or $0.5f_1<f_2<f_1$, where $f_2$ is the write frequency if $f_1$ is the read frequency, or vice versa. A FIFO in accordance with the present invention comprises a dual port random access memory, a read pointer, a write pointer, a synchronization circuit and a status indicator. In the FIFO design, the read pointer indicating the read address is a simple sequential counter, and the write pointer indicating the write address is a Gray code counter. Gray code to sequential count converters are used to convert the Gray codes to sequential counts. The synchronization circuit synchronizes the write pointer and the read pointer using a read clock. A status indicator with simple circuits is provided to indicate if the FIFO is almost full or empty.

19 Claims, 11 Drawing Sheets

APPARATUS AND METHOD FOR ASYNCHRONOUS DUAL PORT FIFO

FIELD OF THE INVENTION

The present invention relates generally to a first-in-first-out (FIFO) random access memory, and more particularly to an apparatus and method for controlling the access of an asynchronous dual port FIFO memory.

BACKGROUND OF THE INVENTION

The random access memory (RAM) commonly used in an asynchronous FIFO includes dual port random access memories and single port random access memories. Generally speaking, the structure of a dual port RAM provides faster access speed, but the chip size for the structure is bigger. While the access speed of a single port RAM is slower, the chip size is smaller. FIG. 1 illustrates a conventional asynchronous FIFO consisting of single port RAM banks, input FIFO ports and output FIFO ports.

For designing an asynchronous dual port FIFO, a circuit structure with a "metastable" architecture can be used to synchronize the accessing control signal if the data in the FIFO are accessed one by one. The main circuit in a metastable architecture comprises three D-type flip-flops and is well known to a person skilled in the field. However, in the case of a write frequency $f_1$ and a read frequency $f_2$, a typical metastable architecture can not be used when burst accessing mode is applied in the asynchronous FIFO design if $0.5f_2 < f_1 < f_2$ or $0.5f_1 < f_2 < f_1$.

Basically, the problem of controlling an asynchronous FIFO is that in an asynchronous FIFO, different access frequencies may result in uncertainty of addresses specified by the read pointer and the write pointer. It is thus hard to determine if the current FIFO status is full or empty.

FIG. 2 illustrates an asynchronous dual port FIFO in which the Gray code method is used to design the FIFO. The architecture of FIG. 2 represents one of the most common approaches to solving the problem associated with the unstable memory addresses. This structure reduces the number of bits of an unstable transient state in a read pointer or write pointer to the minimum, while the pointers are being sampled.

In the design of FIG. 2, the asynchronous FIFO comprises two Gray code counters. One is used as a read pointer, and the other is used as a write pointer. To determine how much memory space in the FIFO memory can be accessed, the Gray codes corresponding to the read and write pointers are first converted to sequential counts. A subtraction is then performed on the two sequential counts in order to determine the available space in the FIFO.

However, the design in FIG. 2 has some disadvantages. Because of different access frequencies to an asynchronous FIFO, the relative positions between these two pointers may not actually tell the true use level of the FIFO even with a synchronized circuit implementation. It also requires two status indicator circuits to determine whether the current FIFO status is full or empty.

SUMMARY OF THE INVENTION

This invention has been made to overcome the above mentioned drawbacks in the control of an asynchronous dual port FIFO. It is an object of the present invention to provide an apparatus and method for controlling the access of an asynchronous dual port FIFO accurately and efficiently. It is also an object of the invention to provide an asynchronous dual port FIFO having simple status indicator circuit for determining the current use level of the FIFO.

According to the present invention, a simple sequential counter instead of a Gray code counter is used as the read pointer in an asynchronous dual port FIFO, and the write pointer is a Gray code counter. The write pointer is sampled by a read clock so as to be synchronized with the read pointer. The read pointer is not synchronized to a write clock.

Using a Gray code counter for the write pointer reduces the number of bits in a transient state to a minimum because in such a counter only one bit changes between two adjacent FIFO addresses. The encoding stability is increased. The read pointer is implemented by a typical sequential counter because the encoding circuit of a sequential counter is better than that of a Gray code counter in terms of timing slacks and circuit areas. In addition, a transient state does not occur in the read pointer because it is not synchronized to the write clock.

To determine how much memory space is available for access, the Gray code corresponding to the write pointer is first converted to sequential format by means of a conversion circuit. After performing subtraction on the two sequential counts of write and read pointers, a status indicator comprising two comparators and a 2's complement block outputs an empty signal if the subtraction result is equal to zero.

The subtraction result is also compared with a threshold value to determine if an almost full signal should be issued. The status indicator outputs an almost full signal only if the available memory space is not greater than the threshold value.

The present invention can be applied to an asynchronous FIFO having frequency relationship $0.5f_2 < f_1 < f_2$, where $f_2$ is the write frequency if $f_1$ is the read frequency, or via versa. As an example, the circuit design can be used in the asynchronous FIFO between an accelerated graphics port (AGP) and a synchronous graphics random access memory (SGRAM), The AGP typically writes data to the FIFO with a write frequency of 66 MHz and the SGRAM reads data from the FIFO with a read frequency of 100 MHz.

The foregoing and other objects, features, aspects and advantages of the present invention will become more apparent from a careful reading of a detailed description provided herein below, with appropriate reference to the accompanying drawings.

DETAILED DESCRIPTION OF THE PREFERRED EMBODIMENTS

Figure 1:
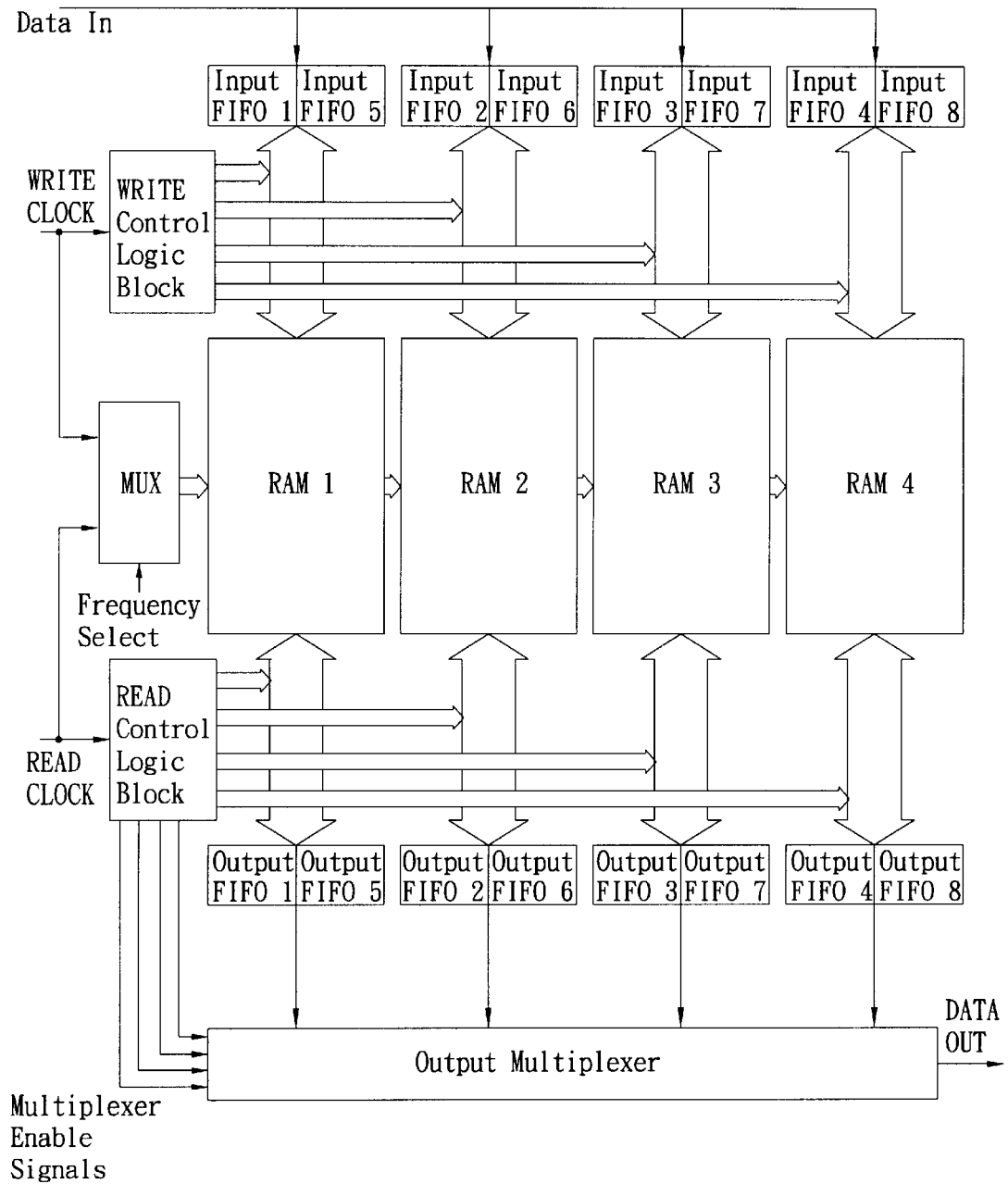
FIG. 1 illustrates a typical asynchronous FIFO comprising single port RAM banks, input FIFO ports and output FIFO ports.
Figure 2:
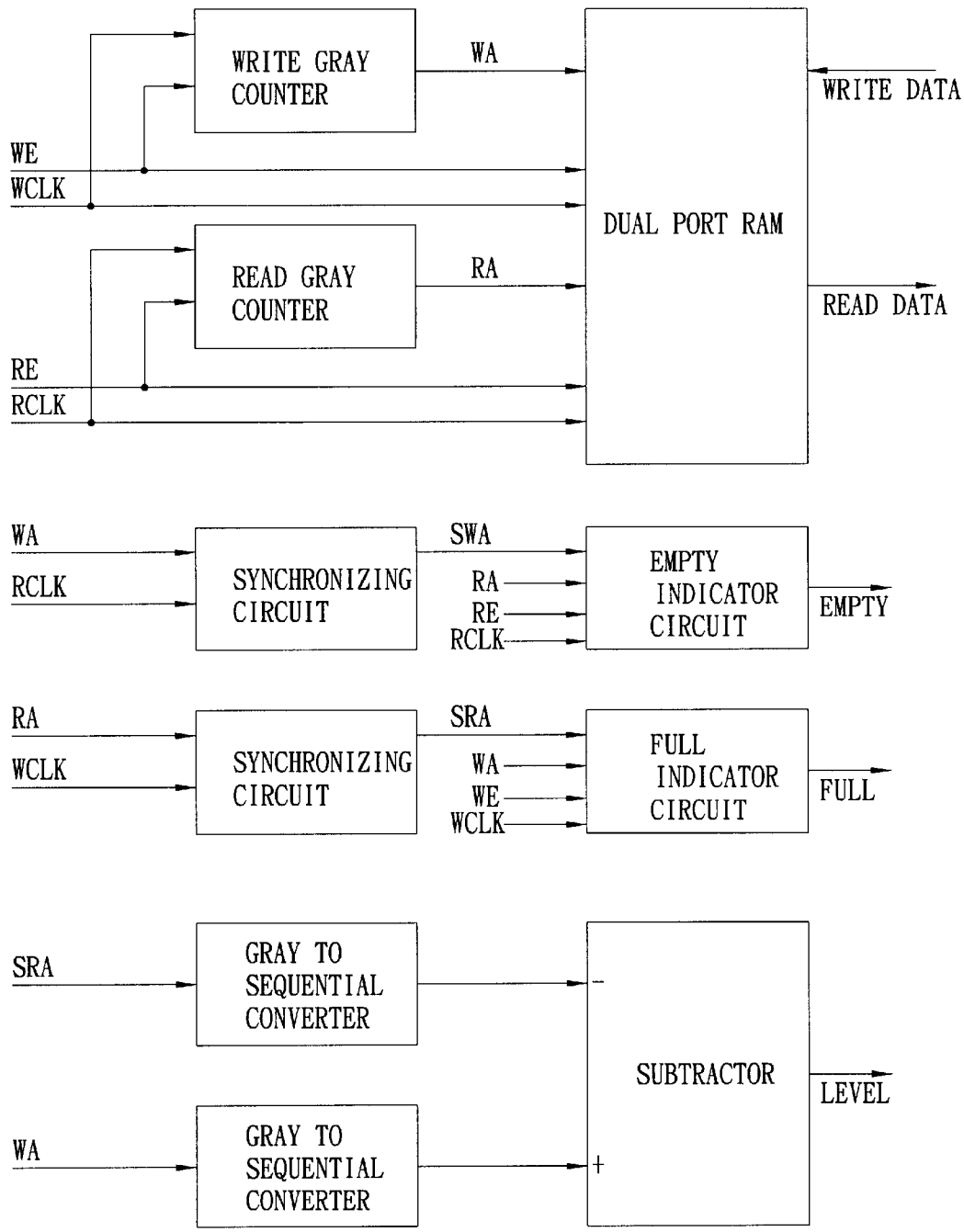
FIG. 2 illustrates the circuit of an asynchronous dual port FIFO using the Gray code method.
Figure 3:
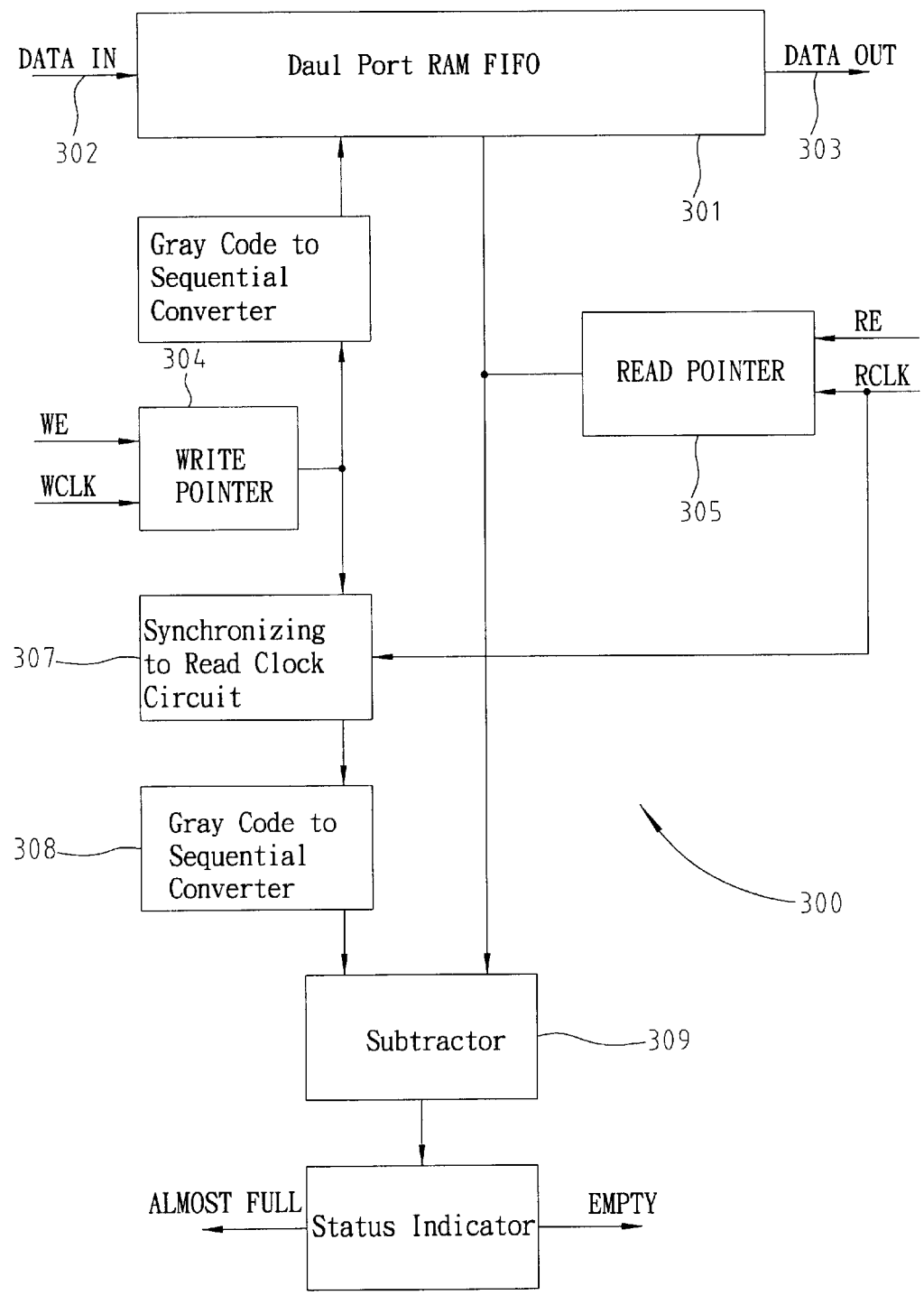
FIG. 3 illustrates an asynchronous dual-port FIFO in accordance with a preferred embodiment of the present invention.

An asynchronous dual-port FIFO in accordance with a preferred embodiment of the present invention is shown in FIG. 3. The asynchronous dual-port FIFO 300 comprises a dual-port RAM 301. Data are written into the RAM 301 through an input port 302, and read from the RAM 301 through an output port 303.

A write pointer 304 is used to indicate a write address and a read pointer 305 is used to indicate a read address. Data can be simultaneously written into and read from the RAM 301. The comparison between the write pointer and the read pointer for determining the available memory space in the FIFO also occurs at the same time. The asynchronous dual-port FIFO thus works very efficiently.

The write pointer 304 is implemented by a Gray code counter. The memory address indicated in such a counter only changes one bit between two adjacent FIFO addresses. This reduces the number of bits in an unstable transient state to a minimum when a FIFO address is changed as well as provides increased encoding stability. A write enable signal WE and a write clock WCLK trigger the Gray code counter. When WE is enabled, the Gray Code counter changes one bit at a time following the rising edge transition of WCLK, and the corresponding write pointer 304 points to the next write address.

The read pointer 305 is implemented by a conventional sequential counter. A read enable signal RE and a read clock RCLK trigger this sequential counter. When RE is enabled, the sequential counter is incremented by 1 following the rising edge transition of RCLK, and the corresponding read pointer 304 points to the next read address. In such a design, because the read pointer 305 is implemented by a sequential counter instead of a Gray code counter, a Gray code encoding is not necessary. In practice, the encoding circuit of the sequential counter has better timing slack and requires smaller area.

Because the encoding method of the read pointer differs from that of the write pointer, Gray code to sequential count converters are used to ensure that the dual port RAM addresses in the two pointers are interpreted in an identical manner. Before the write pointer 304 is sent to the dual port RAM 301, the Gray code is first converted to a sequential count by the a first Gray code to sequential count converter 306. The output of a synchronizing to read clock circuit 307 that synchronizes the write and read pointers is also converted by a second Gray code to sequential count converter 308.

Figure 4:
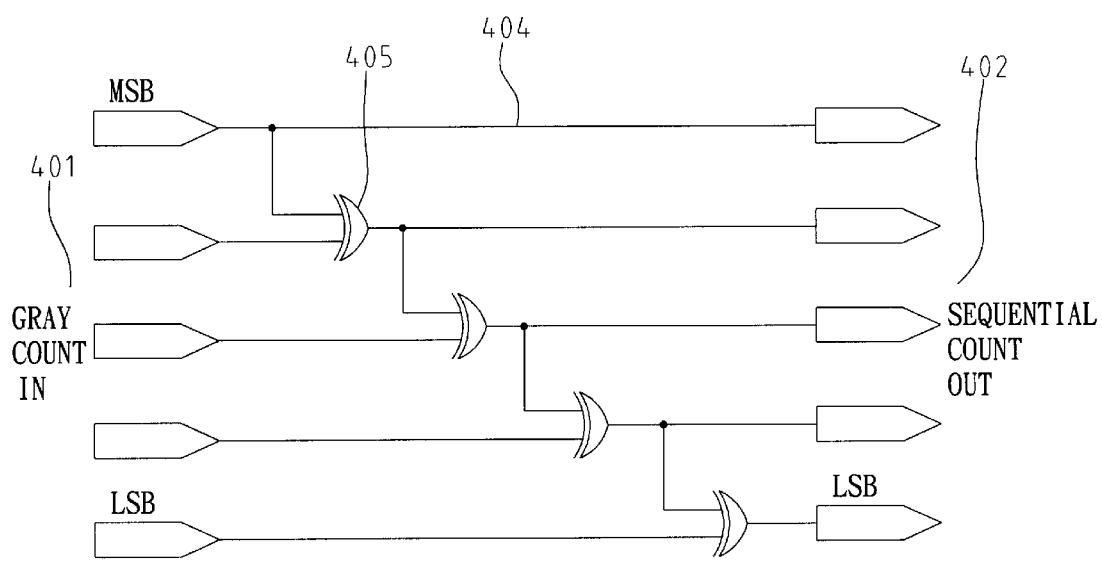
FIG. 4 illustrates a Gray code to sequential count converter used in the asynchronous dual port FIFO of FIG. 3.

The Gray code to sequential count converter 306 or 308 is shown in FIG. 4. The converter 306 or 308 has input 401 for receiving an address in a Gray code format. In the asynchronous dual port FIFO of FIG. 3, for example, if the addresses are five bits wide so the input 401 includes one input line for each of the five bits. The converter 306 or 308 also has an output 402 for outputting an address signal in a sequential count format. The output 402 also includes five individual output lines 404. The Gray code to sequential count conversion is accomplished using the exclusive OR (XOR) gates 405 as shown.

For determining the level of the memory use in the FIFO, the write pointer and the read pointer have to be compared. A synchronization circuit 307 is used to synchronize the two pointers before they are compared by a subtractor 309 so that the comparison result can be stable and accurate. More specifically, the error of the subtraction result between the write pointer 304 and the read pointer 305 can be limited in a special range after the synchronization process. The size of the required memory buffer for handling the error is thus reduced, and the operation of the FIFO becomes more efficient.

Figure 5:
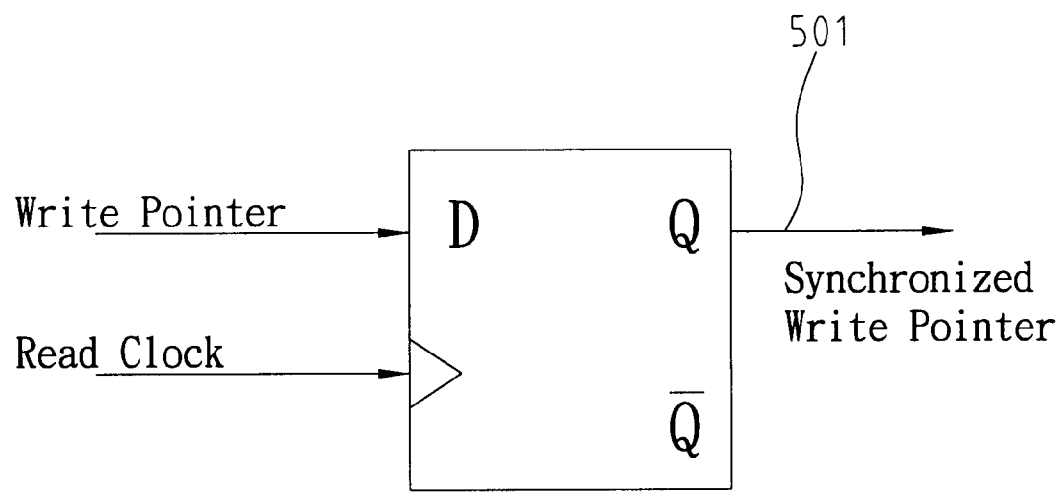
FIG. 5 illustrates a synchronization circuit used in the asynchronous dual port FIFO of FIG. 3.

In order to reduce the possible transient states that may occur in the write pointer 304 and the read pointer 305, the synchronizing to read clock circuit 307 of this invention synchronizes only the write pointer 304 to the read clock RCLK. The read pointer 305 is not synchronized. Therefore, transient states only occur when the write pointer is sampled by the read clock RCLK. The synchronizing to read clock circuit 307 of FIG. 3 is shown in FIG. 5. The circuit is implemented by a D-flip-flop. The write pointer is clocked through the flip-flop 501 synchronously with read clock RCLK to produce the output, synchronized write pointer.

Figure 6:
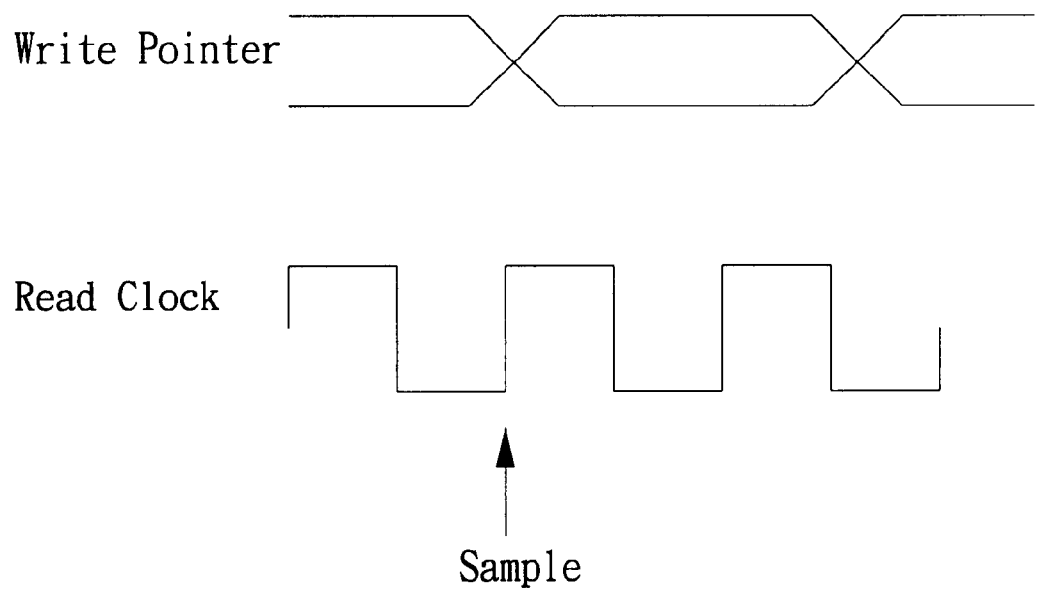
FIG. 6 illustrates how the transient state from one address to its next address in the write pointer is sampled by a read clock.

For such a synchronization circuit as shown in FIG. 5, when the read clock RCLK synchronizes the write pointer 304, it may occur that the transient state from one address to its next address is sampled as illustrated in FIG. 6. As an example, in transferring data between AGP and SGRAM, the clock frequency is 66 MHz for AGP and 100 MHz for SGRAM. Therefore, the read frequency is faster than the write frequency. The write pointer is synchronized to the read clock of 100 MHz. A transient state in the write pointer may be sampled.

In this example the possible error after sampling is very small. The minimum error between the true value and the sampled result is one. The generated error is due to the fact that the address contained in an unstable transient state of the write pointer is sampled. The minimum error is one because in a Gray code counter no more than one bit is changed between two adjacent codes.

As mentioned earlier, the output of the synchronization circuit 307 is converted to a sequential count by a Gray code to sequential count converter 308. The synchronized and converted write pointer and the read pointer are then sent to the subtractor 309 in sequential count format for comparison. In general case, the bit size for the write pointer is equal to that for the read pointer. For example, if a FIFO having a memory size 32*64 is used, then the bit size for both write pointer and read pointer is 5 bits, and a 5-bit subtractor can meet the requirement of the design.

Figure 7:
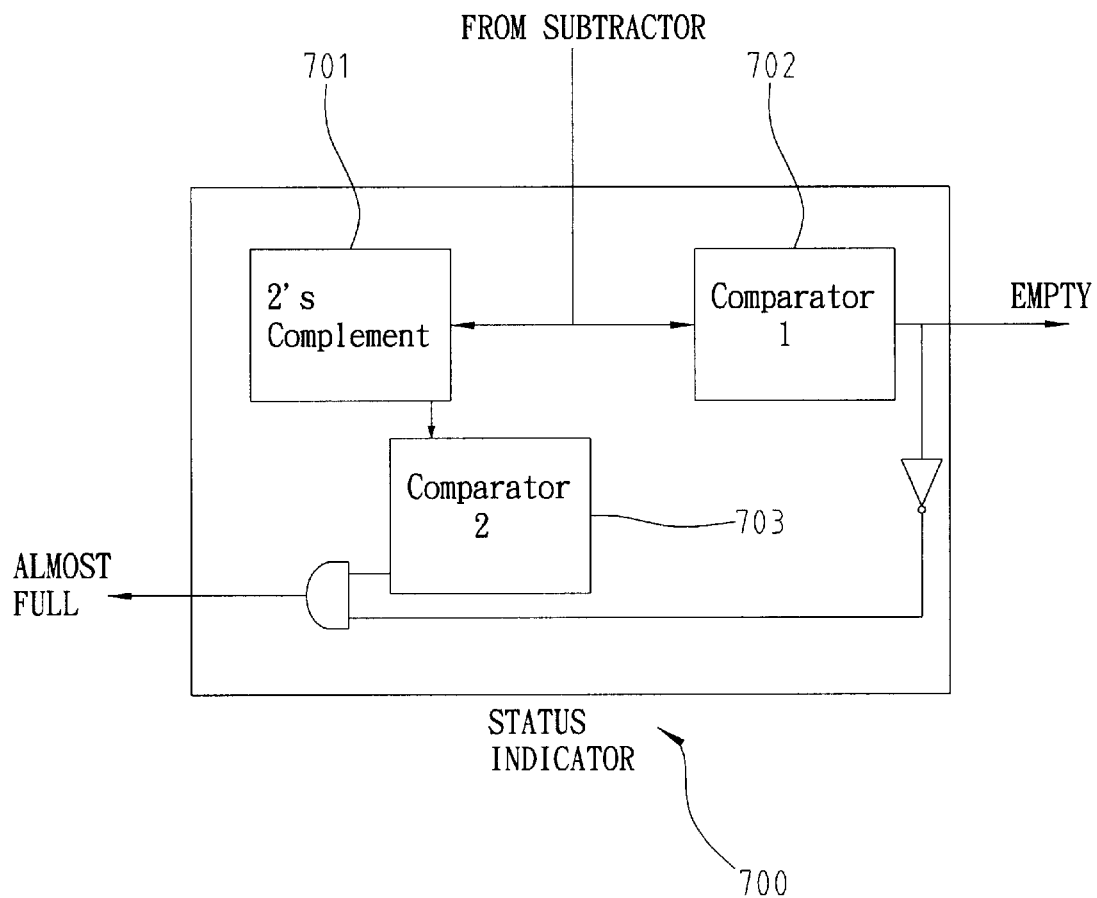
FIG. 7 illustrates a status indicator used in the asynchronous dual port FIFO of FIG. 3.

The subtractor output is sent to a status indicator 700 of the asynchronous dual-port FIFO. The status indicator determines if the current status of the FIFO is almost full or empty. FIG. 7 shows the detail circuit of the status indicator 700. The status indicator 700 comprises a 2's complement block 701, a first comparator 702, and a second comparator 703. The output from the subtractor 309 is sent to the 2's complement block 701 and the first comparator 702. The first comparator 702 compares the subtraction result with zero, and issues a signal EMPTY if they are equal.

The 2's complement block 701 computes the 2's complement of the output from the subtractor 309 and sends the result to the second comparator 703. The second comparator 703 compares the 2's complement with a critical criteria, and issues a signal ALMOST FULL if the 2's complement is not greater than the critical criteria. How the critical criteria is determined will be discussed later. The pre-determined criteria for the example of transferring data between AGP and SGRAM is 7.

As can be seen, if the output from the subtractor 309 is zero, the error condition of simultaneously triggering both signals EMPTY and ALMOST FULL may occur. To prevent the error condition from occurring, the status indicator 700 of the invention uses the EMPTY signal to trigger a NOT gate (inverter) and an AND gate for controlling the output of ALMOST FULL signal.

Note that in the above example of transferring data between AGP and SGRAM, the critical criteria is set to 7 for determining whether to issue the ALMOST FULL signal or not. If the output of 2's complement block 701 is not greater than the pre-determined value 7, the signal ALMOST FULL is issued. In other words, no more than seven data units is available in the FIFO if an ALMOST FULL signal is issued.

The reason of selecting seven data units as a critical criteria is as follows:

(1) AGP requires four clock cycles (referred to as $T_{AGP}$) to transfer a block of data.

(2) The synchronizing to read clock circuit 307 is implemented by a D flip-flop, and it may delay a clock cycle (referred to as $T_{D1}$) while a write pointer is being sampled by the read clock.

(3) The ALMOST FULL signal has to be loaded to an input port, and the clock frequency (66 MHz in this example) of the input port differs from that of generating the ALMOST FULL signal. Therefore, it may delay another clock cycle (referred to as $T_{D2}$) while the ALMOST FULL signal is being sampled. As can be seen, it requires at least six ($T_{AGP}+T_{D1}+T_{D2}$) data units available to transfer a block of data.

(4) It is possible that the output of the subtractor 309 indicates there is space for seven data units in the FIFO but the true available space can only hold six data units due to the error caused by the transient state of the write pointer. Under the circumstance, if the AGP continues to write a block of data into the FIFO, the output from the subtractor 309 can be zero if the delays caused by the conditions in (2) and (3) also occur. In such a case, the status indicator would determine that the current status of the FIFO is empty. However, the true status of the FIFO is full. To prevent the wrong decision from being made, the invention adds one more data unit in the criteria (the extra clock cycle is referred to as $T_2$).

Based on the forgoing discussions, the present invention uses the worst case, i.e., seven available data units as the critical condition for the design of an asynchronous FIFO between AGP and SGRAM. In other words, an ALMOST FULL signal is issued if $T_{AGP}+T_{D1}+T_{D2}+T_2<=7$.

As can be seen, in accordance with the invention, when it is determined that there is space for seven data units in the FIFO, a memory space for four data units may be considered available for writing a block of data into the FIFO memory in the worst case after the conditions of (2)–(4) are taken into account. The data writing at that moment is interrupted because of the issuing of an ALMOST FULL signal. Therefore, even with an error caused by a transient state in the synchronization circuit 307, the suspension of data transferring will prevent the FIFO from operating incorrectly.

After completing data transferring of a current block, AGP samples the ALMOST FULL signal. It stops transferring the next data unit if ALMOST FULL signal is asserted. AGP keeps sampling ALMOST FULL signal until the signal is de-asserted. It then starts to transfer the next block of data to the FIFO.

As mentioned earlier, the status indicator 700 issues a signal EMPTY if the output from the subtractor 309 is zero. The signal EMPTY is sent to the output port of the FIFO, and it stops reading data from the FIFO. Because of the possible error resulted from the transient state in the synchronization circuit 307, there may still be one data unit in the FIFO to read. Nevertheless, the output port keeps sensing the signal EMPTY. After the transient state of the synchronization circuit 307, the signal EMPTY is de-asserted. It then starts to read data from the FIFO.

As can be seen, while designing an asynchronous FIFO according to the preferred embodiment, it is necessary to precisely define an EMPTY signal in order to read all the data written into the FIFO. However, an extra buffer in the FIFO may be reserved for defining an ALMOST FULL signal to prevent an error from occurring. Therefore, the present invention uses the synchronizing to read clock circuit 307, as shown in FIG. 5, in which the synchronization is with respect to the read clock. It simplifies the determination of the EMPTY signal because a transient state only occurs in the write pointer but not in the read pointer. Therefore, in accordance with the invention, the method of determining an empty status of an asynchronous FIFO is unaffected by changes in the read or write frequency of the FIFO.

The asynchronous dual port FIFO of this invention is useful in the asynchronous data transfer between AGP and SGRAM. The design can also be applied to any asynchronous FIFO having frequency relationship $0.5f_2<f_1<f_2$, where $f_2$ is the write frequency if $f_1$ is the read frequency, or vice versa.

In a general asynchronous FIFO design, it takes only one clock cycle to transfer a data unit. Using $T_1=1$ for the clock cycle to replace the previously discussed delay $T_{AGP}$, an ALMOST FULL signal has to be issued if $T_1+T_{D1}+T_{D2}+T_2<=4$. Thus, the critical criteria for issuing an ALMOST FULL signal is four data units under this condition. Therefore, for a general asynchronous FIFO, the status indicator issues an ALMOST FULL signal if the output from the 2's complement block is not greater than 4.

It is also worth mentioning that the write frequency in a general asynchronous FIFO may be faster than the read frequency in some case. Under the circumstance, an additional clock cycle $T_3=1$ has to be taken into account because a slower read clock is used to sample the write pointer. Two data units may have been written into the FIFO before a decision of the ALMOST FULL signal has been made. Consequently, the overall clock cycles for determining the issuing of the ALMOST FULL signal is $T_1+T_{D1}+T_{D2}+T_2+T_3<=5$. In other words, it is necessary for the status indicator 700 to issue an ALMOST FULL signal if the available space in the FIFO is equal to or less than five data units.

Figure 8A:
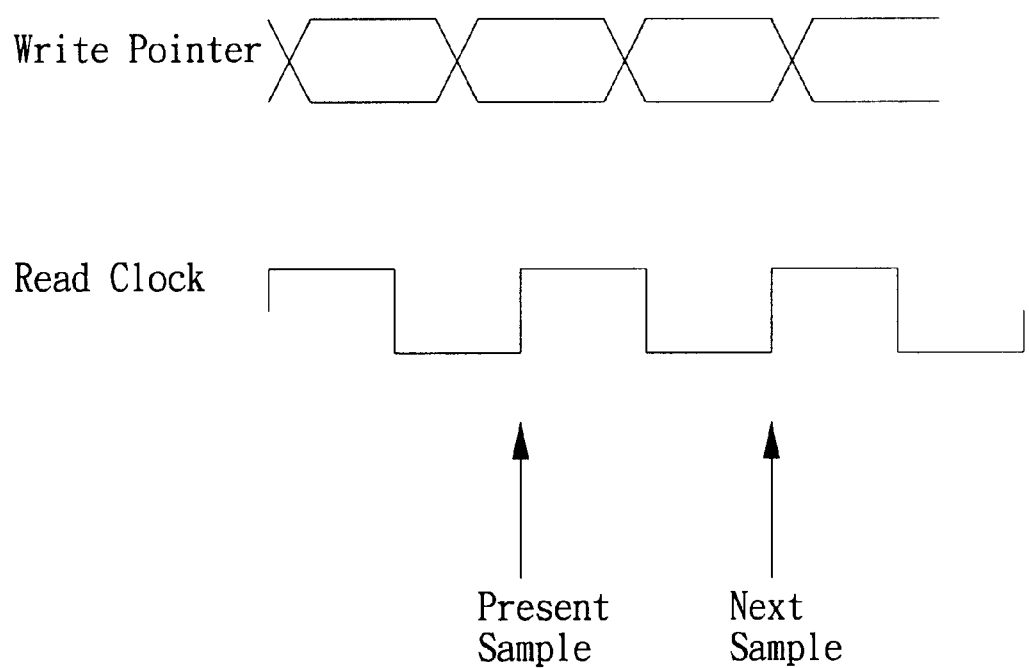
FIGS. 8a–8c illustrate three different possible situations when the write pointer is sampled by a read clock if the frequency of the write pointer is faster than that of the read clock in a general asynchronous dual port FIFO.
Figure 8B:
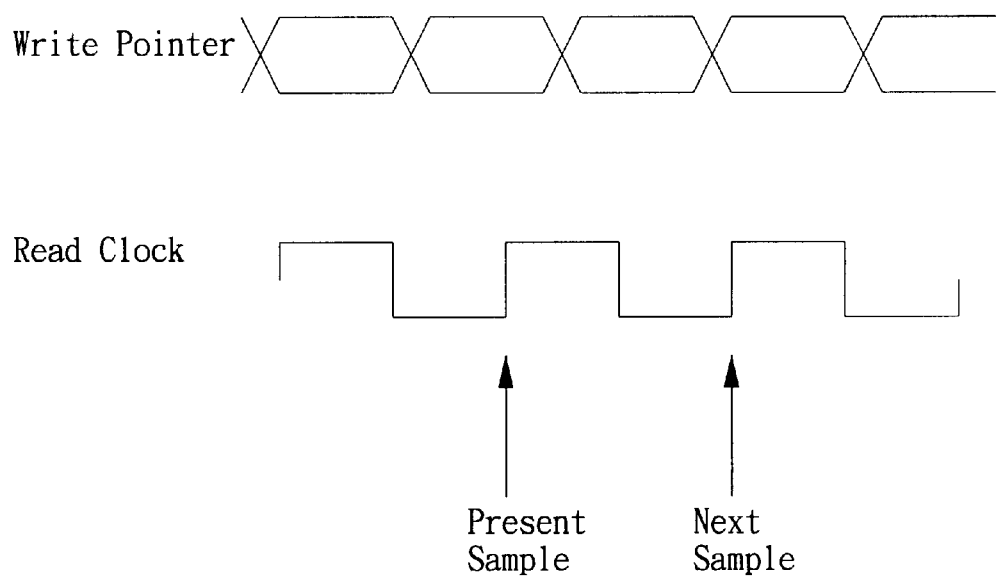
Figure 8C:
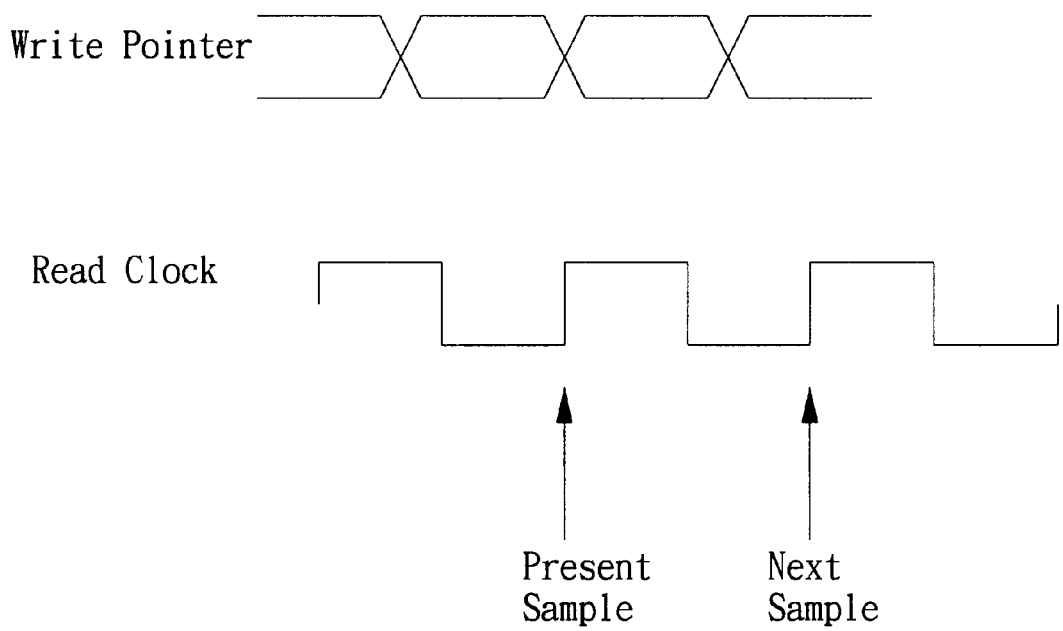

FIGS. 8a–8c illustrate how the write pointer may be sampled by the read clock when the write frequency is faster than the read frequency. In FIG. 8a, the write pointer changes only once between the two read clocks. FIG. 8b, however, shows that the write pointer changes twice between the two read clocks. In FIG. 8c, the first read clock occurs at the transient state of the write pointer and the sensed write pointer change may be one or two. Therefore, an additional data unit has to be included in determining the ALMOST FULL signal for the asynchronous FIFO.

Figure 9:
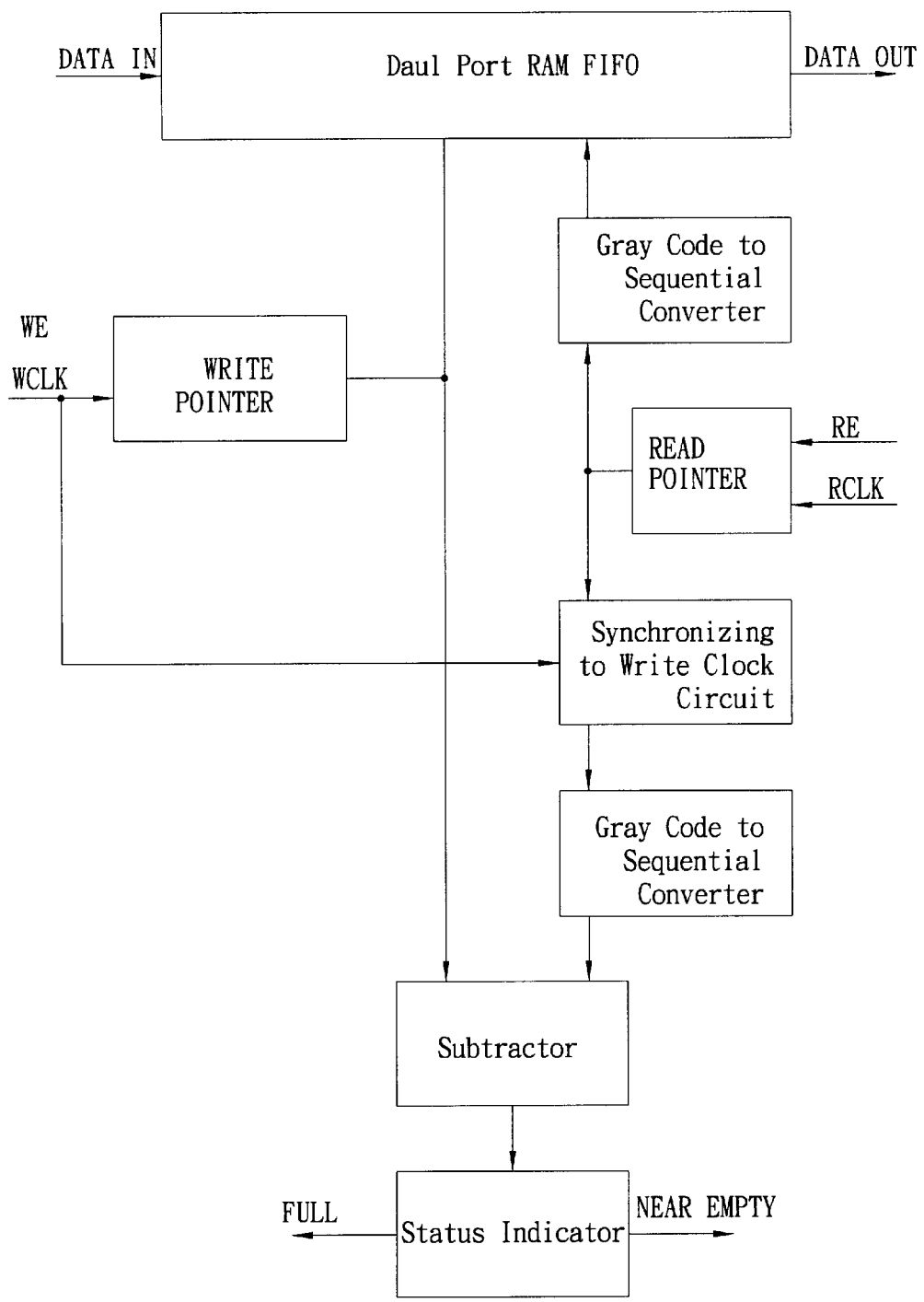
FIG. 9 illustrates an asynchronous dual-port FIFO in accordance with an alternative embodiment of the present invention.

The forgoing discussion has assumed that it is necessary to precisely define an EMPTY signal in order to read all the data written into the FIFO and extra buffer space in the FIFO may be reserved for defining an ALMOST FULL signal to prevent an error from occurring. In some case, if it is more critical to define a FULL signal precisely for an asynchronous FIFO, an alternative embodiment as shown in FIG. 9 may be used.

In the alternative embodiment, the synchronization of the write printer and the read pointer is with respect to the write clock to simplify the determination of the FULL signal. The read pointer is implemented by a Gray code counter and the write pointer is implemented by a sequential counter. Therefore, two Gray code to sequential count converters are used to convert the address indicated by the read pointer from Gray code format to sequential count format.

In this embodiment, a transient state only occurs in the read pointer. Extra buffer space in the FIFO is reserved for defining a NEAR EMPTY signal to prevent an error from occurring. The principle for designing the status indicator in the embodiment of FIG. 3 can be applied to the design of the status indicator of FIG. 9. Because of the similarity between FIG. 3 and FIG. 9, the detail of the circuit for the asynchronous dual port FIFO of this embodiment is not described here.

Although this invention has been described with a certain degree of particularity, it is to be understood that the present disclosure has been made by way of preferred embodiments only and that numerous changes in the detailed construction and combination as well as arrangement of parts may be restored to without departing from the spirit and scope of the invention as hereinafter set forth.

What is claimed is:

1. An asynchronous dual port first-in-first-out memory buffer comprising:
   a dual-port random access memory;
   a read pointer indicating a read address for reading data words from said random access memory in response to a read clock, said read address being in a first format;
   a write pointer indicating a write address in a second format;
   a first converter for converting said write address from said second format to said first format for writing data words into said random access memory in response to a write clock;
   a synchronization circuit for synchronizing said write pointer to said read clock so as to output a synchronized write pointer for indicating a synchronized write address in said second format;
   a second converter for converting said synchronized write address from said second format to said first format;
   a subtractor for obtaining the difference between said synchronized and converted write address and said read address; and
   a status indicator receiving said difference and generating status signals for indicating the use level of said first-in-first-out memory buffer;
   wherein said status signals comprise a first status signal for indicating that said first-in-first-out memory buffer is almost full when the 2's complement of said difference from said subtractor is not greater than a pre-determined critical value.

2. The asynchronous dual port first-in-first-out memory buffer according to claim 1, wherein said synchronization circuit synchronizes said write pointer to said read pointer using said read clock.

3. The asynchronous dual port first-in-first-out memory buffer according to claim 1, wherein said write pointer is a Gray code counter, said first and second converters are Gray code to sequential count converters and said read pointer is a sequential counter.

4. The asynchronous dual port first-in-first-out memory buffer according to claim 1, wherein said status signals further comprise a second status signal for indicating that said first-in-first-out memory buffer is empty when said difference from said subtractor is zero.

5. The asynchronous dual port first-in-first-out memory buffer according to claim 4, wherein said status indicator further comprises:
   a 2's complement block for obtaining the 2's complement of said difference from said subtractor;
   a first comparator receiving said 2's complement of said difference for generating said first status signal indicating if said first-in-first-out memory buffer is almost full; and
   a second comparator receiving said difference from said subtractor and generating said second status signal indicating if said first-in-first-out memory buffer is empty.

6. The asynchronous dual port first-in-first-out memory buffer according to claim 5, wherein said status indicator further includes an AND gate receiving the output signal of said first comparator and an inverted signal of said second status signal for generating said first status signal indicating if said first-in-first-out memory buffer is almost full.

7. A method of controlling the access of an asynchronous dual port first-in-first-out memory buffer having a dual-port random access memory, comprising the steps of:
   providing a read pointer containing a read address in a first format for reading data words from said random access memory in response to a read clock having a first frequency $f_1$;
   providing a write pointer containing a write address in a second format;
   converting said write address from said second format to said first format for writing data words into said random access memory in response to a write clock having a second frequency $f_2$;
   providing a synchronization circuit for synchronizing said write pointer to said read pointer so as to output a synchronized write pointer containing a synchronized write address in said second format;
   converting said synchronized write address in said second format to said first format;
   computing the difference between said synchronized and converted write address and said read address in said first format; and
   asserting a first status signal for indicating that said first-in-first-out memory buffer is almost full when the 2's complement of said difference is not greater than a pre-determined critical value.

8. The method according to claim 7, wherein synchronizing said write pointer to said read pointer is accomplished by synchronizing said write pointer to said read clock.

9. The method according to claim 7, said first frequency f1 and said second frequency f2 having a relationship satisfying 0.5f2<f1<f2 or 0.5f1<f2<f1.

10. The method according to claim 7, said read address in said first format being encoded as sequential count and said write address in said second format being encoded as Gray code.

11. The method according to claim 7, wherein said pre-determined critical value is 4 when 0.5f1<f2<f1.

12. The method according to claim 7, wherein said pre-determined critical value is 5 when 0.5f2<f1<f2.

13. The method according to claim 7, wherein said pre-determined critical value is 7 when said asynchronous first-in-first-out memory is an asynchronous first-in-first-out memory between an accelerated graphics port and a synchronous graphics random access memory.

14. The method according to claim 7, further comprising the step of asserting a second status signal for indicating that said first-in-first-out memory buffer is empty when said difference is zero.

15. The method according to claim 14, wherein said first status signal indicating if said first-in-first-out memory buffer is almost full is generated by an AND operation between an inverted signal of said second status signal and a result of comparing said 2's complement of said difference with said pre-determined critical value.

16. An asynchronous dual port first-in-first-out memory buffer comprising:

a dual-port random access memory;

a write pointer indicating a write address for writing data words into said random access memory in response to a write clock, said write address being in a first format;

a read pointer indicating a read address in a second format;

a first converter for converting said read address from said second format to said first format for reading data words from said random access memory in response to a read clock;

a synchronization circuit for synchronizing said read pointer to said write pointer so as to output a synchronized read pointer for indicating a synchronized read address in said second format;

a second converter for converting said synchronized read address from said second format to said first format;

a subtractor for obtaining the difference between said synchronized and converted read address and said write address; and a status indicator receiving said difference and generating status signals for indicating the use level of said first-in-first-out memory buffer;

wherein said status signals comprise a first status signal for indicating that said first-in-first-out memory buffer is near empty when the 2's complement of said difference from said subtractor is not greater than a pre-determined critical value.

17. The asynchronous dual port first-in-first-out memory buffer according to claim 16, wherein said synchronization circuit synchronizes said read pointer to said write pointer using said write clock.

18. The asynchronous dual port first-in-first-out memory buffer according to claim 16, wherein said read pointer is a Gray code counter, said first and second converters are Gray code to sequential count converters and said write pointer is a sequential counter.

19. The asynchronous dual port first-in-first-out memory buffer according to claim 16, wherein said status signals further comprise a second status signal for indicating that said first-in-first-out memory buffer is full when said difference from said subtractor is zero.

* * * * *